US012726862B2

(12) United States Patent
Goyal et al.

(10) Patent No.: US 12,726,862 B2
(45) Date of Patent: Sep. 1, 2026

(54) UPLINK GRANT ALLOCATION FOR RACH-LESS LOWER LAYER MOBILITY

(71) Applicant: Nokia Technologies Oy, Espoo (FI)

(72) Inventors: Sanjay Goyal, Denville, NJ (US); Panagiotis Spapis, Munich (DE); Umur Karabulut, Munich (DE); Ali Karimidehkordi, Munich (DE); Timo Koskela, Oulu (FI); Anastasios Kakkavas, Munich (DE); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 362 days.

(21) Appl. No.: 18/196,078

(22) Filed: May 11, 2023

(65) Prior Publication Data

US 2024/0381198 A1 Nov. 14, 2024

(51) Int. Cl.
*H04W 36/00* (2009.01)

(52) U.S. Cl.
CPC .............................. *H04W 36/00837* (2018.08)

(58) Field of Classification Search
CPC ......... H04W 36/00837; H04W 36/087; H04W 36/08; H04W 56/0045; H04W 74/0833
See application file for complete search history.

(56) References Cited

U.S. PATENT DOCUMENTS 12,245,087 B2 * 3/2025 Hwang ........... H04W 36/00725
2012/0093128 A1 * 4/2012 Song ................. H04W 36/0077 370/331
2018/0049079 A1 * 2/2018 Ozturk .................. H04W 28/16
2018/0332507 A1 * 11/2018 Fujishiro ......... H04W 36/00692
2020/0053779 A1 2/2020 Jeon et al.
2022/0353922 A1 11/2022 Rastegardoost et al.
2023/0413139 A1 * 12/2023 Xu ........................ H04L 5/0094

FOREIGN PATENT DOCUMENTS

GB 2628818 A * 10/2024 ............ H04W 36/06
GB 2628821 A * 10/2024 ...... H04W 36/00725
WO WO-2018067063 A1 * 4/2018 ...... H04W 36/00725
WO 2021/019125 A1 2/2021
WO 2023/117779 A2 6/2023

OTHER PUBLICATIONS

"New WID on Further NR mobility enhancements", Media Tek, 3GPP TSG RAN Meeting #94e, RP-213565, Dec. 2021, 5 pages.
"Revised WID on Further NR mobility enhancements", Media Tek Inc., 3GPP TSG RAN Meeting #96, RP-221799, Jun. 2022, 5 pages.

(Continued)

*Primary Examiner* — Cheikh T Ndiaye
(74) *Attorney, Agent, or Firm* — Robert P. Michal, Esq.; Rimon PC

(57) ABSTRACT

An apparatus configured to: receive, from a source cell, a physical downlink control channel order, wherein the physical downlink control channel order comprises, at least, an indication of a target cell; transmit, to the target cell, a random access channel signaling; receive an indication of an uplink grant and an indication of a timer value associated with the uplink grant; and receive, from the source cell, an indication to perform cell change to the target cell.

1 Claim, 8 Drawing Sheets

(56) References Cited

OTHER PUBLICATIONS

"Revised WID on Further NR mobility enhancements", Media Tek Inc., Apple, 3GPP TSG RAN Meeting #98-e, RP223520, Dec. 2022, 5 pages.
"Msc-generator", Sourceforge, Retrieved on Jul. 17, 2024, Webpage available at : https://sourceforge.net/projects/msc-generator/.
"3rd Generation Partnership Project; Technical Specification Group Radio Access Network; NR; Multiplexing and channel coding (Release 17)", 3GPP TS 38.212, V17.5.0, Mar. 2023, pp. 1-203.
U.S. Appl. No. 18/296,911, "Timing Advance Resource Management", filed on Apr. 6, 2023, pp. 1-64.
"RACH-less cell switch in LTM", 3GPP TSG-RAN WG2 Meeting #121, R2-2301150, Agenda: 8.4.2.3, Huawei, Feb. 27-Mar. 3, 2023, 8 pages.
"3rd Generation Partnership Project; Technical Specification Group Radio Access Network; NR; Medium Access Control (MAC) protocol specification (Release 17)", 3GPP TS 38.321, V17.4.0, Mar. 2023, pp. 1-252.
"3rd Generation Partnership Project; Technical Specification Group Radio Access Network; NG-RAN; F1 application protocol (F1AP) (Release 17)", 3GPP TS 38.473, V17.4.1, Apr. 2023, pp. 1-690.
"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.
"3rd Generation Partnership Project; Technical Specification Group Radio Access Network; NR; Physical layer procedures for data (Release 17)", 3GPP TS 38.214, V17.5.0, Mar. 2023, pp. 1-231.
"Revised WID on Further NR mobility enhancements", 3GPP TSG RAN Meeting #98-e, RP-223520, Agenda: 9.3.2.1, MediaTek Inc., Dec. 12-16, 2022, 5 pages.
"Revised WID on Further NR mobility enhancements", 3GPP TSG RAN Meeting #96, RP-221799, Agenda: 9.3.2.1, MediaTek Inc., Jun. 6-9, 2022, 5 pages.
"New WID on Further NR mobility enhancements", 3GPP TSG RAN Meeting #94e, RP-213565, Agenda: 8A.2, MediaTek, Dec. 6-17, 2021, 5 pages.
"Report of Offline Discussion [016] for Early TA Acquisition and RACH-Less", 3GPP TSG RAN2#123 Meeting, R2-230xxxx, Agenda: 7.4.2.3, ZTE Corporation, Aug. 21-25, 2023, 28 pages.
"3rd Generation Partnership Project; Technical Specification Group Services and System Aspects; Policy and Charging Control Framework for the 5G System; Stage 2 (Release 15)", 3GPP TS 23.503, V15.3.0, Sep. 2018, pp. 1-70.
"3rd Generation Partnership Project; Technical Specification Group Radio Access Network; NR; User Equipment (UE) radio access capabilities (Release 18)", 3GPP TS 38.306, V18.0.0, Dec. 2023, pp. 1-303.
International Search Report and Written Opinion received for corresponding Patent Cooperation Treaty Application No. PCT/IB2024/052789, dated Jul. 1, 2024, 14 pages.
"Text Proposal for Handover Latency Reduction Solutions", 3GPP TSG-RAN WG2 Meeting #92, R2-156921, Agenda: 7.10.3, Intel Corporation, Nov. 16-20, 2015, pp. 1-3.
"On Two-Stage UL scheduling for eLAA", 3GPP TSG RAN WG1 Meeting #86, R1-167074, Agenda: 7.2.1.1, Nokia, Aug. 22-26, 2016, 7 pages.

* cited by examiner

700 transmit, to a user equipment, a physical downlink control channel order, wherein the physical downlink control channel order comprises, at least, an indication of a target cell

710

receive, from a centralized unit, an indication of an uplink grant and an indication of a timer value associated with the uplink grant, wherein the uplink grant and the timer are associated with the target cell

720

start a validity timer for the uplink grant based, at least partially, on the timer value

730

transmit, to the user equipment, at least the indication of the uplink grant

800 receive, from a user equipment, a random access channel signaling

810 transmit, to a centralized unit, at least an indication of a timing advance, an uplink grant, and a timer value

UPLINK GRANT ALLOCATION FOR RACH-LESS LOWER LAYER MOBILITY

TECHNICAL FIELD

The example and non-limiting embodiments relate generally to cell change within a central-unit distributed-unit structure and, more particularly, to resource allocation.

BACKGROUND

It is known, in the multi-RAT mobility concept, to perform RACH-less handover.

SUMMARY

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: receive, from a source cell, a physical downlink control channel order, wherein the physical downlink control channel order comprises, at least, an indication of a target cell; transmit, to the target cell, a random access channel signaling; receive an indication of an uplink grant and an indication of a timer value associated with the uplink grant; and receive, from the source cell, an indication to perform cell change to the target cell.

In accordance with one aspect, a method comprising: receiving, with a user equipment from a source cell, a physical downlink control channel order, wherein the physical downlink control channel order comprises, at least, an indication of a target cell; transmitting, to the target cell, a random access channel signaling; receiving an indication of an uplink grant and an indication of a timer value associated with the uplink grant; and receiving, from the source cell, an indication to perform cell change to the target cell.

In accordance with one aspect, an apparatus comprising means for performing: receiving, from a source cell, a physical downlink control channel order, wherein the physical downlink control channel order comprises, at least, an indication of a target cell; transmitting, to the target cell, a random access channel signaling; receiving an indication of an uplink grant and an indication of a timer value associated with the uplink grant; and receiving, from the source cell, an indication to perform cell change to the target cell.

In accordance with one aspect, a non-transitory computer-readable medium comprising program instructions stored thereon for performing at least the following: causing receiving, from a source cell, of a physical downlink control channel order, wherein the physical downlink control channel order comprises, at least, an indication of a target cell; causing transmitting, to the target cell, of a random access channel signaling; causing receiving of an indication of an uplink grant and an indication of a timer value associated with the uplink grant; and causing receiving, from the source cell, of an indication to perform cell change to the target cell.

In accordance with one aspect, an apparatus comprising: at least one processor; and at least one memory storing instructions that, when executed by the at least one processor, cause the apparatus at least to: transmit, to a user equipment, a physical downlink control channel order, wherein the physical downlink control channel order comprises, at least, an indication of a target cell; receive, from a centralized unit, an indication of an uplink grant and an indication of a timer value associated with the uplink grant, wherein the uplink grant and the timer are associated with the target cell; start a validity timer for the uplink grant based, at least partially, on the timer value; and transmit, to the user equipment, at least the indication of the uplink grant.

In accordance with one aspect, a method comprising: transmitting, with a network node to a user equipment, a physical downlink control channel order, wherein the physical downlink control channel order comprises, at least, an indication of a target cell; receiving, from a centralized unit, an indication of an uplink grant and an indication of a timer value associated with the uplink grant, wherein the uplink grant and the timer are associated with the target cell; starting a validity timer for the uplink grant based, at least partially, on the timer value; and transmitting, to the user equipment, at least the indication of the uplink grant.

In accordance with one aspect, an apparatus comprising means for performing: transmitting, to a user equipment, a physical downlink control channel order, wherein the physical downlink control channel order comprises, at least, an indication of a target cell; receiving, from a centralized unit, an indication of an uplink grant and an indication of a timer value associated with the uplink grant, wherein the uplink grant and the timer are associated with the target cell; starting a validity timer for the uplink grant based, at least partially, on the timer value; and transmitting, to the user equipment, at least the indication of the uplink grant.

In accordance with one aspect, a non-transitory computer-readable medium comprising program instructions stored thereon for performing at least the following: causing transmitting, to a user equipment, of a physical downlink control channel order, wherein the physical downlink control channel order comprises, at least, an indication of a target cell; causing receiving, from a centralized unit, of an indication of an uplink grant and an indication of a timer value associated with the uplink grant, wherein the uplink grant and the timer are associated with the target cell; starting a validity timer for the uplink grant based, at least partially, on the timer value; and causing transmitting, to the user equipment, of at least the indication of the uplink grant.

In accordance with one aspect, an apparatus comprising: at least one processor; and at least one memory storing instructions that, when executed by the at least one processor, cause the apparatus at least to: receive, from a user equipment, a random access channel signaling; and transmit, to a centralized unit, at least an indication of a timing advance, an uplink grant, and a timer value.

In accordance with one aspect, a method comprising: receiving, with a network node from a user equipment, a random access channel signaling; and transmitting, to a centralized unit, at least an indication of a timing advance, an uplink grant, and a timer value.

In accordance with one aspect, an apparatus comprising means for performing: receiving, from a user equipment, a random access channel signaling; and transmitting, to a centralized unit, at least an indication of a timing advance, an uplink grant, and a timer value.

In accordance with one aspect, a non-transitory computer-readable medium comprising program instructions stored thereon for performing at least the following: causing receiving, from a user equipment, of a random access channel signaling; and causing transmitting, to a centralized unit, of at least an indication of a timing advance, an uplink grant, and a timer value.

According to some aspects, there is provided the subject matter of the independent claims. Some further aspects are defined in the dependent claims.

BRIEF DESCRIPTION OF THE DRAWINGS

The foregoing aspects and other features are explained in the following description, taken in connection with the accompanying drawings, wherein:

FIG. 7 is a flowchart illustrating steps as described herein; and

FIG. 8 is a flowchart illustrating steps as described herein.

DETAILED DESCRIPTION OF EMBODIMENTS

Figure 1:
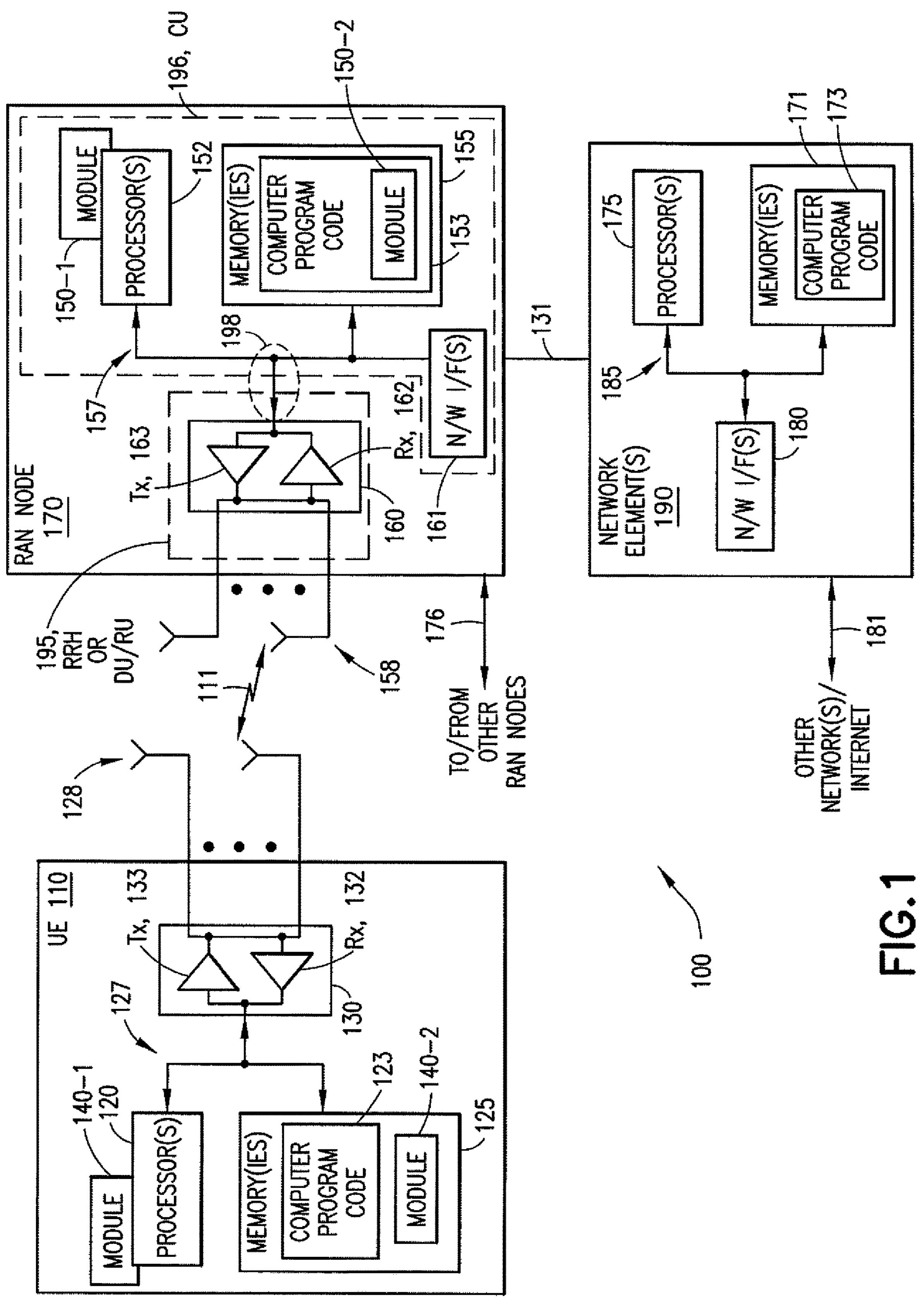
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
ACK acknowledgement
AMF access and mobility management function
CBRA contention-based random access
CE control element
CFRA contention-free random access
CHO conditional handover
cRAN cloud radio access network
CRC cyclic redundancy check
C-RNTI cell-radio network temporary identifier
CU central unit
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HARQ hybrid automatic repeat request
HO handover
I/F interface
L1 layer 1
L3 layer 3
LTE long term evolution
LTM L 1/2-triggered mobility
MAC medium access control
MME mobility management entity
ng or NG new generation
ng-eNB or NG-eNB new generation eNB
NR new radio
N/W or NW network
O-RAN open radio access network
PBCH physical broadcast channel
PDCCH physical downlink control channel
PDCP packet data convergence protocol
PHY physical layer
PRACH physical random-access channel
QCL quasi co-location
RA random access
RACH random access channel
RAN radio access network
RAR random access response
RF radio frequency
RLC radio link control
RRC radio resource control
RRH remote radio head
RS reference signal
RSRP reference signal received power
RU radio unit
Rx receiver
SDAP service data adaptation protocol
S-DU source distributed unit
SGW serving gateway
SMF session management function
SRS sounding reference signal
SS synchronization signal
SSB synchronization signal block
TA timing advance
TCI transmission configuration indicator
T-DU target distributed unit
Tx transmitter
UE user equipment (e.g., a wireless, typically mobile device)
UL uplink
UPF user plane function
VNR virtualized network function Turning to FIG. 1, this figure shows a block diagram of one possible and non-limiting example in which the examples may be practiced. A user equipment (UE) 110, radio access network (RAN) node 170, and network element (s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein may generally relate to 5G New Radio and, in particular, Multi-RAT Mobility (MRM) concept targeted for 3GPP Rel-18 and beyond, which enables and improves mobility/cell-changes in RAN where the Central-Unit/Distributed-Unit (CU-DU) structure is deployed (i.e. enabling operations between different DU (inter-DU) of different vendors via CU (involving the Control Plane or/and User Plane aspects of the Central-Unit, CU-CP, CU-UP)).

Features as described herein may generally relate to lower layer mobility, in particular, L1/L2 triggered mobility (LTM). LTM, also denoted as L1/2 inter-cell mobility, is one of the objectives for mobility enhancement in Rel. 18 work item. In LTM, the decision about the cell change is based on L1 measurements, and is made in the MAC layer by the serving distributed unit (DU).

Figure 2:
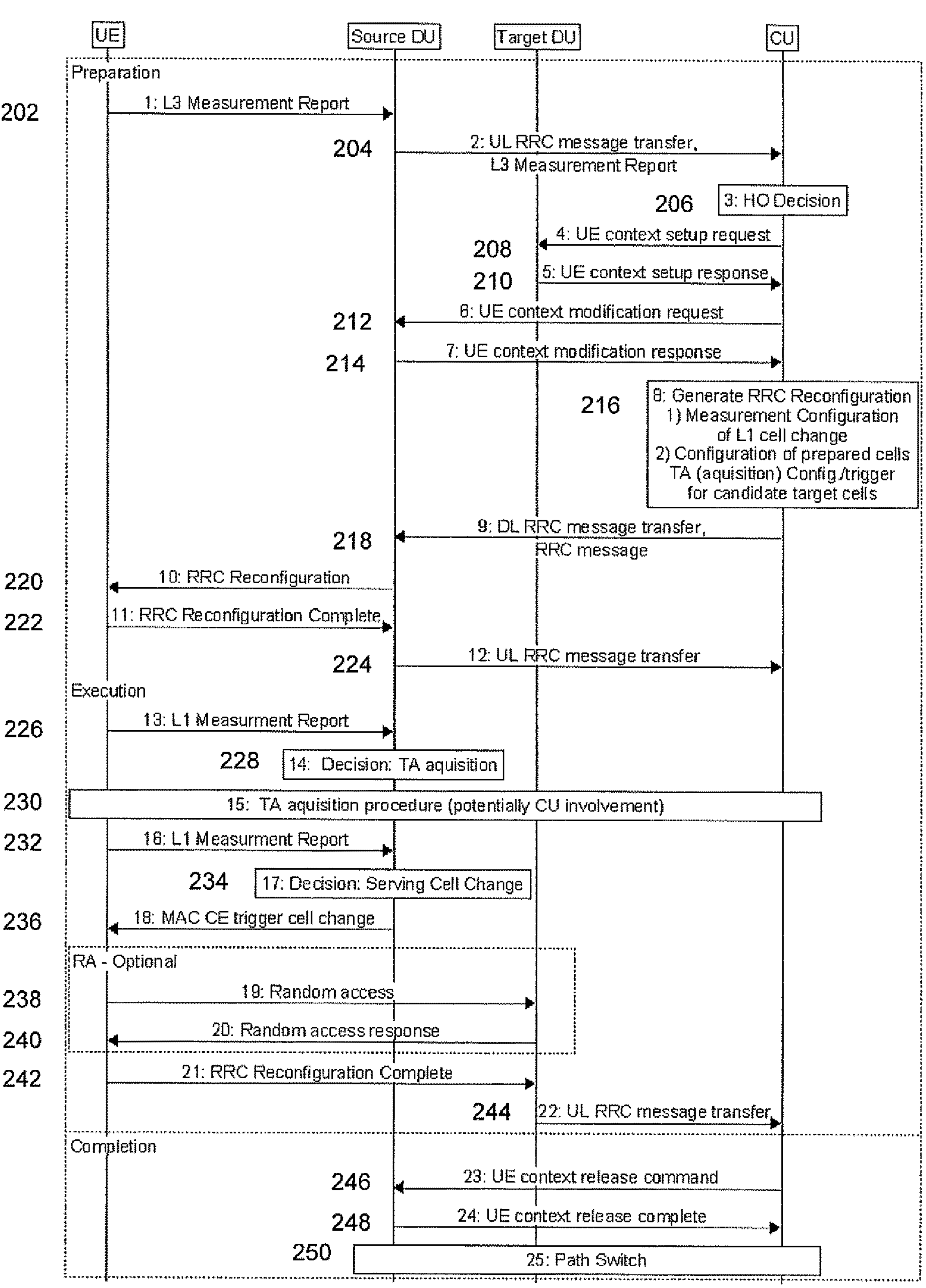
FIG. 2 is a flowchart illustrating steps as described herein.

Referring now to FIG. 2, illustrated is an exemplary message exchange for the inter-DU LTM scenario, captured for disaggregated architecture. At 202, the UE may provide the L3 measurements to the source distributed unit (DU), which at 204 may be forwarded to the centralized unit (CU). At 206, based on these measurements, the CU may decide about the cell preparation, for example the handover decision, and may proceed in setting up the UE context in the target DU. At 208, the CU may transmit, to the target DU, a UE context setup request. At 210, the target DU may transmit, to the CU, a UE context setup response. The source-DU/CU and the candidate target-DUs/CUs may coordinate on the TA acquisition method, for example during LTM preparation phase. At 212/214, the CU may communicate with the source DU for the modification of the UE context, if needed, and the provision of the target cell information (e.g., one or more of target cell RS configuration, TCI states, RACH configuration, etc.).

At 216, the CU may create and forward the RRC Reconfiguration message of the cells that are prepared for the handover to the source DU using a DL RRC message transfer, at 218. The RRC Reconfiguration may include a measurement configuration of L1 cell change and/or a configuration of prepared cells TA (acquisition) for configuring/triggering for candidate target cells. At 220, the source DU may forward the RRC Reconfiguration to the UE. At 222, the UE may respond to the CU with an RRC Reconfiguration Complete message to the CU, which may be forwarded via the source DU at 224.

At 226, based on its configuration, the UE may provide the (e.g., periodic) L1 reports to the source DU. At 228, the source DU may make a decision regarding TA acquisition based on the received L1 measurement report. At 230, a TA acquisition procedure may be performed. For example, the source DU may trigger the UE, for example by sending a physical downlink control channel (PDCCH) order, to acquire TA for the set of candidate cells (i.e. candidate cells for the handover target cell). Regarding the mechanism to acquire TA of the candidate cells, other solutions (in addition to random access channel (RACH)-based PDCCH order-based mechanism) like Rx timing difference based, RACH-less mechanism as in LTE, sounding reference signal (SRS) based TA acquisition, etc. are further studied.

At 232, the UE may continue L1 measurement reporting. Once the source DU decides that the UE should be handed over to a cell (i.e. target cell) of another DU (i.e. target DU), at 234, it may trigger the cell switch, at 236, for example using a cell switch command (e.g. a MAC CE). Then, the UE may apply the RRC configuration for the target cell of the target DU indicated by the cell switch command (via MAC CE) and may switch to the target DU.

Optionally, the UE may be configured to perform Random Access (RA) to the target cell, as shown at 238, wherein the UE may transmit, to the target DU, a random access message, and receive, at 240 from the target DU, a random access response. However, in other solutions, the UE may be configured to not perform the RA to the target cell, as it may have already acquired the TA of the target cell (e.g. RACH-less LTM).

To initiate communication with the target DU, at 242 the UE may transmit an RRC Reconfiguration Complete message using already configured UL resources to the target cell of the target DU, which at 244 may be forwarded to the CU-CP.

At 246, the CU may release the UE context from the source DU with a UE Context Release Request, and the source DU may transmit, to the CU, a UE context release complete message. At 250, the CU may perform a path switch to the new DU.

In the present disclosure, the terms candidate cell, target cell, and candidate target cell may be used interchangeably. In the present disclosure, the terms serving cell and serving DU may be used interchangeably. In the present disclosure, the terms serving cell/DU and source cell/DU may be used interchangeably. In the present disclosure, the terms cell Switch and handover may be used interchangeably.

It is noted that the term Layer 1/2 (L1/2) Triggered Mobility (LTM) is the 3GPP RAN2 agreed term for lower layer (L1/2) mobility.

Features as described herein may generally relate to early timing advance (TA) acquisition in Rel-18 LTM. The following agreements include a sub-set of agreements made in the last four 3GPP RAN1 meetings (RAN1 #110-bis, October 2022 and RAN1 #111, November 2022, RAN1 #112, February 2023, RAN1 #112-bis April 2023) regarding the early TA acquisition of a candidate target cell for Rel-18 L1/L2 triggered mobility (LTM). RAN1 #110-bis-e supported TA acquisition of candidate cell(s) before the cell switch command is received in L1/L2 based mobility. RAN1 #111 described a mechanism to acquire TA of the candidate cell(s) in Rel-18 LTM, and at least supported PDCCH ordered RACH. The PDCCH order is only triggered by the source cell. RAN1 #112 agreed that the PDCCH order from the source cell contains the indication of the candidate cell. The reserved bit(s) in DCI format 1_0 for PDCCH order can be used for indication of cell identity. It also agreed that, for PDCCH ordered-RACH for candidate cell(s), random access response (RAR) reception can be configured/indicated. If reception of RAR is not configured/indicated (without RAR), the TA value of candidate cell may be indicated in the cell switch command. It also agreed that, if reception of RAR is configured/indicated, RAR contains at least the TA of the candidate cell. The maximum number of TA values memorized by UE may be a UE capability. RAN1 #112-bis-e agreed that, for PDCCH ordered-RACH, if reception of BAR is not configured, UE autonomous re-transmission of PRACH is not allowed, regardless of the configuration of PreambleTransMax. When reception of BAR is configured, support BAR is received from serving cell at least in intra-DU case. When reception of RAR is configured, support RAR is received from serving cell in inter-DU case.

Features as described herein may generally relate to Physical Downlink Control Channel (PDCCH) Order Details [Section 7.3.1.2.1, TS 38.212]. A Layer 1 downlink control indication (DCI) format 1_0 is used to send a PDDCH order from source DU to the UE. The following information is transmitted by means of the DCI format 1_0 with a cyclic redundancy check (CRC) scrambled by a cell-radio network temporary identifier (C-RNTI).

An identifier for the DCI formats may be transmitted via the DCI format, for example with 1 bit. The value of this bit field is always set to 1, indicating a DL DCI format Frequency domain resource assignment may be transmitted via the DCI format. For example, bits may be included for the size of CORESET 0 if CORESET 0 is configured for the cell; otherwise, it may be the size of initial DL bandwidth part. The value of this field may be set to all ones.

A random access preamble index may be transmitted via the DCI format, for example with 6 bits according to ra-Preamblelndex in Clause 5.1.2 of [8, TS38.321]. It may indicate which random-access preamble to use in case of contention free random access (CFRA) or the value 000000 in the case of contention based random access (CBRA) procedure. If the preamble index bit is set as '0' then the UE may trigger a contention-based random-access procedure, or else if the preamble index is >0, then the UE may trigger a contention-free random-access procedure. Non-zero values may be used to allocate the dedicated PRACH index (0 to 63) to the UE.

A UL/SUL indicator may be transmitted via the DCI format, for example with 1 bit. If the value of the "Random Access Preamble index" is not all zeros and if the UE is configured with supplementaryUplink in ServingCellConfig in the cell, this field may indicate which UL carrier in the cell to transmit the PRACH according to Table 7.3.1.1.1-1 in TS 38.212; otherwise, this field may be reserved.

A synchronization signal (SS) or physical broadcast channel (PBCH) index may be transmitted via the DCI format, for example with 6 bits. If the value of the "Random Access Preamble index" is not all zeros, this field may indicate the SS/PBCH that may be used to determine the RACH occasion for the PRACH transmission; otherwise, this field may be reserved.

A PRACH Mask index may be transmitted via the DCI format, for example with 4 bits. If the value of the "Random Access Preamble index" is not all zeros, this field may indicate the RACH occasion associated with the SS/PBCH indicated by "SS/PBCH index" for the PRACH transmission, according to Clause 5.1.1 of [8, TS38.321]; otherwise, this field may be reserved.

Reserved bits may be transmitted via the DCI format, for example with 12 bits for operation in a cell with shared spectrum channel access in frequency range 1, or when the DCI format is monitored in common search space for operation in a cell in frequency range 2-2; otherwise, 10 bits may be used.

Further in RAN1-112, for the PDCCH order contents, it was agreed that the PDCCH order from the source cell may contain the indication of the candidate cell. The reserved bit(s) may be used for indication of cell identity. Further in RAN1 112-bis-e, an additional explicit indication whether the PRACH transmission is an initial or a retransmission may also be contained in the PDCCH order when RAR reception is not configured. This is to facilitate the transmission power determination for the PRACH transmission at the UE side.

In 3GPP Rel-18, no timer was allocated for UL grant resources. Individual single release requests to release ALL resources (=LTM preparations) allocated in candidate target DU regarding the UE were provided, which means that, then, the LTM is no longer possible to the candidate target DU (since prepared resources/cells have been released). In 3GPP Rel-18, there is no possibility to release UL grant resources except release of all resource preventing LTM, unless new preparations are started.

In Release-18 L1/2 triggered mobility (LTM), RACH-less handover has been agreed. In order to perform RACH-less handover, PDCCH ordered RACH is supported to perform early TA acquisition (i.e. acquiring the TA of a candidate target cell before the cell switch, e.g. while having a connection with the source cell). For a PDCCH ordered RACH based solution, two options are supported: (1) option 1—RAR is not configured—after the PRACH transmission to a candidate target cell, the UE does not monitor for a response (RAR), instead the TA is transmitted to the UE later in the cell switch command; (2) option 2—RAR is configured—after the PRACH transmission to a candidate target cell, the UE monitors for a RAR containing at least the TA from the source cell.

After performing PDCCH ordered RACH based early TA acquisition with the target cell, the UE typically is not configured to perform any RACH after the cell switch command is received. In such a scenario, it is not clear how to determine UL grant for the UE to communicate with the target cell after the cell switch command is received.

In an example embodiment of the present disclosure, UL grant allocation to communicate with the target cell after the cell switch may be provided in the context of PDCCH ordered RACH based early TA acquisition for Rel-18 LTM. A technical effect of example embodiments of the present disclosure may be to minimize resource overhead. A technical effect of example embodiments of the present disclosure may be to reduce the time period of unnecessary resource allocation in a candidate target cell for LTM cell switching. A technical effect of example embodiments of the present disclosure may be to provide UL grants for a limited number of relevant candidate target cells. A technical effect of example embodiments of the present disclosure may be to minimize a resource reservation period for the allocated UL grants, which may dynamically enable the release of UL grant resources in a candidate target cell if not needed. A technical effect of example embodiments of the present disclosure may be to ensure the validity of the UL grant given to the UE at the time of cell switch.

In an example embodiment, a UL grant may be allocated by a candidate target cell at the time of PDCCH ordered RACH procedure. In an example embodiment, a quasi co-location (QCL) reference (e.g. spatial domain filter coefficients) for the UL grant may be set as same as the one used for PRACH reception from the UE. In an example embodiment, an expiry timer may be associated with a UL grant allocated to the UE. In an example embodiment, validity of the UL grant may be checked at the S-DU or UE using both the expiry timer and the QCL reference. In an example embodiment, validity of the UL grant may be updated based on the L1 measurement reports. In an example embodiment, the release of UL grants at candidate cells may be performed without an explicit indication.

In an example embodiment, a timer may be attached to a UL grant resource to release the resource without a further individual request. In an example embodiment, the validity of the UL grant may be checked at the S-DU or UE using both the expiry timer and the QCL reference. In an example embodiment, validity of the UL grant may be updated based on the L1 measurement reports.

In an example embodiment, a source DU may request the UE to perform TA with a target DU, for example via a PDCCH order.

In an example embodiment, a target DU may allocate UL grant resource for the UE on this beam and start a timer during which the UL grant resource may be valid/allocated to UE, and may notify the source DU about the timer until the UL grant resource is allocated. Upon new measurement reports on target cell/beam, the timer may be prolonged and resource allocation may be prolonged.

In an example embodiment, a network node/gNB capability indicator may be provided which may be configured to indicate the support of an example embodiment of the present disclosure, and/or a Rel-18 UL grant release timer capability, to other network nodes and/or the UE. In an example embodiment, a network node may receive a capability indicator from the UE to support an example embodiment of the present disclosure. In an example embodiment, a UE capability indicator may be provided to a network node/gNB.

Figure 3:
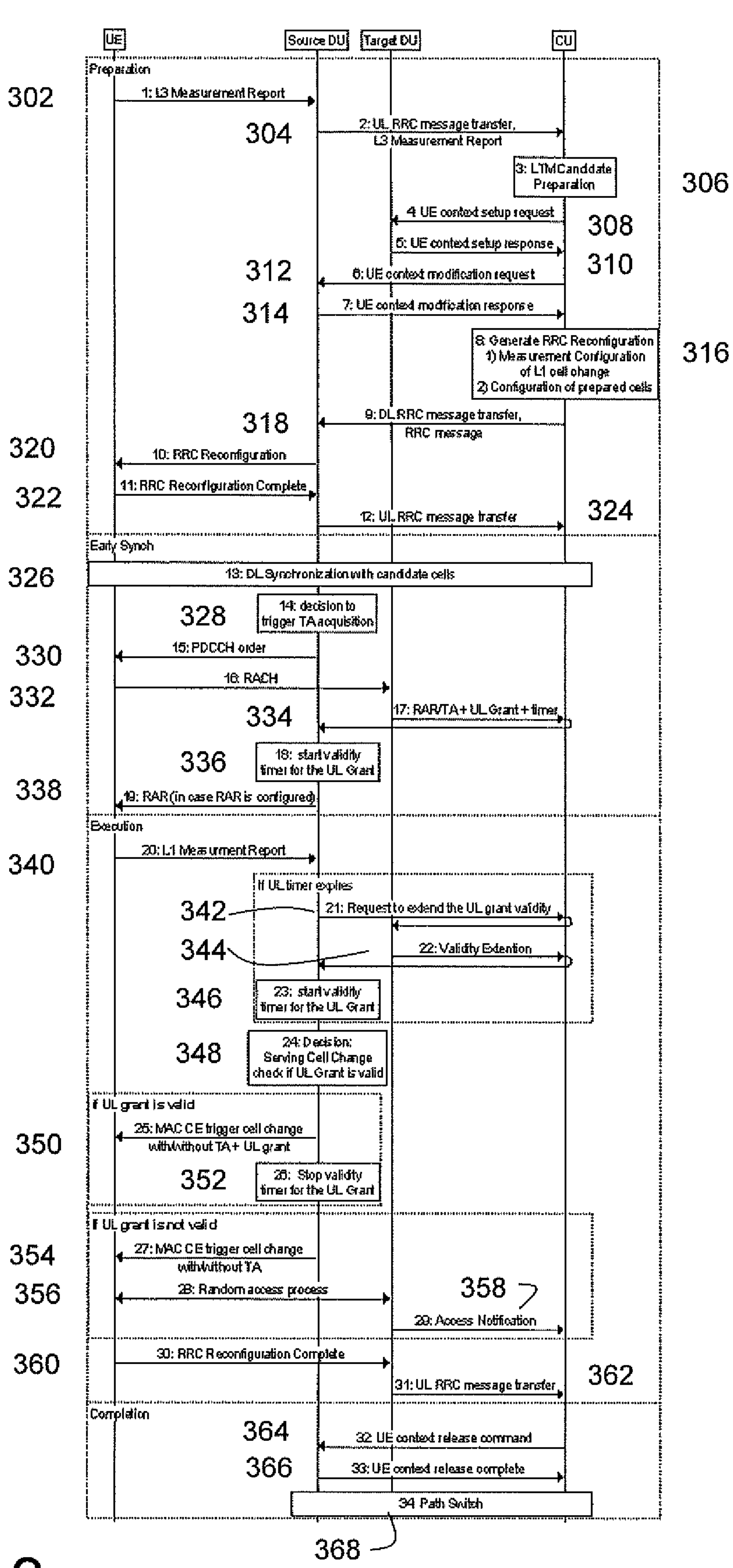
FIG. 3 is a flowchart illustrating steps as described herein.

In an example embodiment, alternative 1, a source DU based mechanism may be defined. Referring now to FIG. 3, illustrated is an example of signaling for alternative 1. At 302, the UE may transmit, to the source DU, an L3 measurement report. At 304, the source DU may transmit, to the CU, a UL RRC message transfer, which may include the L3 measurement report. At 306, the CU may perform LTM candidate preparation. At 308, the CU may transmit, to the target DU, a UE context setup request. At 310, the target DU may transmit, to the CU, a UE context setup response. At 312, the CU may transmit, to the source DU, a UE context modification request. At 314, the source DU may transmit, to the CU, a UE context modification response. At 316, the CU may generate an RRC reconfiguration, which may comprise a measurement configuration of L1 cell change, and/or a configuration of prepared cells. At 318, the CU may transmit, to the source DU, a DL RRC message transfer, which may comprise an RRC message (e.g. the RRC reconfiguration). At 320, the source DU may transmit, to the UE, the RRC reconfiguration. At 322, the UE may transmit, to the source DU, an RRC reconfiguration complete message. At 324, the source DU may transmit, to the CU, a UL RRC message transfer.

At 326, a DL synchronization with candidate cells may be performed. At 328, the source DU may decide to trigger TA acquisition. At 330, the source DU may transmit, to the UE, a PDCCH order. At 332, the UE may transmit, to the target DU, a RACH. At 334, the target DU may transmit, to the CU, a response containing at least TA, a UL grant, and/or a timer. The CU may forward this information to the source DU. At 336, the source DU may start a validity timer for the UL grant. At 338, the source DU may transmit, to the UE, a PAR or response containing at least the TA value, for example if the PAR is configured.

The source DU (S-DU) controlling the source cell, after sending a PDCCH order to a UE, may receive a message from the candidate target DU (T-DU) controlling the prepared candidate target cell containing one or more parameters, for example including a UL grant and an associated expiry timer value (duration of the timer T) (e.g. at 334).

In an example embodiment, the UL grant and an associated expiry timer value (duration of the timer T) may be sent along with the estimated TA value which the candidate target cell estimated using the recent PRACH reception from the UE (e.g. at 334). The UL grant may be associated with the PRACH reception in terms of QCL reference.

In an example embodiment, the T-DU may first receive a request on the need for UL resources. This may be requested by the S-DU/CU, for example as part of UE context transmission (e.g. at 308), or later during HO measurement (e.g. after the measurement of the UE with respect to the T-DU reaches to a certain threshold).

In an example embodiment, the S-DU/CU may send a request to the T-DU/CU (e.g. at 312) including desired UL resource configuration (e.g. number of resources, time and frequency of the allocated resources, periodicity of resources, and timer length, and expected time to start/finish the resource reservation) to the T-DU/CU and T-DU/CU may accept or modify the requested resources.

In an example embodiment, the transmission of PRACH may indicate the need for UL resources (e.g. by selecting a specific preamble index).

At 340, the UE may transmit, to the source DU, an L1 measurement report.

The S-DU may start the timer T after receiving the information of the UL grant and the associated timer value (e.g. the T-DU may start activating the UL grant after it sends the estimated TA plus some delay which may be caused in delivering the TA to the S-DU). In an example embodiment, the T-DU may also provide the S-DU with additional information on when the UL resources are activated (starting point of the timer).

If the UL timer expires, at 342 the source DU may transmit, to the CU, a request to extend the UL grant validity. At 344, the target DU may transmit, to the CU, a validity extension, which may be forwarded to the source DU. At 346, the source DU may start a validity timer for the UL grant. At 348, the source DU may decide to perform a serving cell change. The source DU may check if the UL grant is valid.

If the UL grant is valid, at 350, the source DU may transmit, to the UE, a MAC CE trigger cell change. The cell change trigger may or may not include a TA and an UL grant. At 352, the source DU may stop the validity timer for the UL grant.

If the UL grant is not valid (e.g. invalid), at 354, the source DU may transmit, to the UE, a MAC CE triggering cell change with/without TA. At 356, a random access process may be performed. At 358, the target DU may transmit, to the CU, an access notification.

Whether or not the UL grant is valid, at 360, the UE may transmit, to the target DU, an RRC reconfiguration complete message. At 362, the target DU may transmit, to the CU, an UL RRC message transfer.

At 364, the CU may transmit, to the source DU, a UE context release command. At 366, the source DU may transmit, to the CU, a UE context release complete message. At 368, path switching may be performed.

The timer T may be stopped by the S-DU when it sends a cell switch command to the UE (e.g. at 350/354).

In an example embodiment, the S-DU may send an indication (explicit/implicit, via CU) to one or more candidate target cells, not selected as the target cell for the UE for cell switch, for which the UL grant timer has not expired in order to indicate the release of the associated UL grants. In one option, such release indication may be used for releasing only an allocated UL grant. For example, the release message may indicate the grant to be released. In another option, such release indication may also be used to release other reserved resources (e.g. RACH configuration in addition to the allocated grant) at the candidate target cell.

In an example embodiment, the timer T may be stopped (e.g., before 350/354) by the S-DU when there is any change in the radio condition of the UE with respect to the candidate target cell, for example when the quality of the synchronization signal block (SSB) giving the PDCCH order to the UE (e.g. at 330) is below a certain threshold (e.g. the QCL reference of the UL grant may not be used by the UE due to poor radio conditions).

In an example embodiment, the S-DU may trigger another PDCCH order with a different SSB for which the quality is above a certain threshold. In an alternative example embodiment, the S-DU may trigger RACH-based cell switch if the candidate target cell is selected as the target cell.

In an alternative example embodiment, the S-DU may send an UL resource update request to the target-DU together with the required information (e.g. a measurement result, a SSB ID, or a TCI state ID).

In another example embodiment, the timer T may be stopped (e.g., before 350/354) when the candidate target cell is released and no longer prepared for LTM switch. In one option, the indication of release of a candidate target cell may be sent by the CU to the S-DU or by the candidate target DU to S-DU (via CU).

In another example embodiment, if the timer T expires (e.g., before 350/354), the S-DU may send a request to the candidate target DU to extend/renew the validity of the UL grant (e.g. at 342). The S-DU may receive a confirmation from the T-DU (e.g. at 344) on the validity extension/renewal of the timer (with/without the timer value, e.g. a new duration Ti (different from the previous duration) may be provided). The S-DU may start the timer T/Tl after receiving the confirmation from the T-DU (e.g. at 346). In a further example embodiment, the request to extend/renew (e.g. at 342) may be conditioned on the quality of the radio link between the UE and the target cell, for example when the quality of the SSB given in the PDCCH order to the UE is above a certain threshold. In a further example embodiment, the T-DU may respond to the request to extend/renew the validity of the UL grant (e.g. at 344) with a new UL grant and associated timer expiry value.

In another example embodiment, the S-DU may trigger another PDCCH order with a different SSB for which the quality is above a certain threshold.

In another example embodiment, the S-DU may trigger RACH-based cell switch if the candidate target cell is selected as the target cell.

In an example embodiment, instead of a timer, the T-DU/CU may send an indication of resource validation/expiry to the S-DU.

In another example embodiment, the T-DU/CU (e.g. based on a request from the S-DU) may provide the S-DU a pool of UL resources, and the S-DU may allocate the pool to the UE(s) in a time division/frequency division multiplexing manner. The S-DU request to the target-DU may be accompanied by additional information, for example the probability of using the resources. After triggering the cell switch (e.g. at 350/354), the S-DU may inform the T-DU about the user/resource allocation. As another option, the UE may provide the UE identification with the UL through the UL transmission.

In another example embodiment, the value of the timer may be communicated by the CU to the DU (e.g. at 334).

In another example embodiment, after the cell switch command transmitted to the UE (e.g. at 350/354), the S-DU may share the information of the UL grant (with remaining validity duration, associated SSB index, and/or associated candidate target cell identity) to candidate target cells (e.g. not selected as the target cell for the UE for cell switch). This may be useful, for example, for dynamic LTM switching. The recipient candidate target cell may use/provide the valid UL grants for further (e.g., subsequent) cell switching for one or more UEs. For example, if a source cell has a valid TA (or the UE based TA mechanism is configured) for a candidate target cell, and also has a valid UL grant (e.g. received from another cell), the source cell may provide the valid grant to the UE (e.g. without performing any TA acquisition) to perform cell switching to the candidate target cell.

Figure 4:
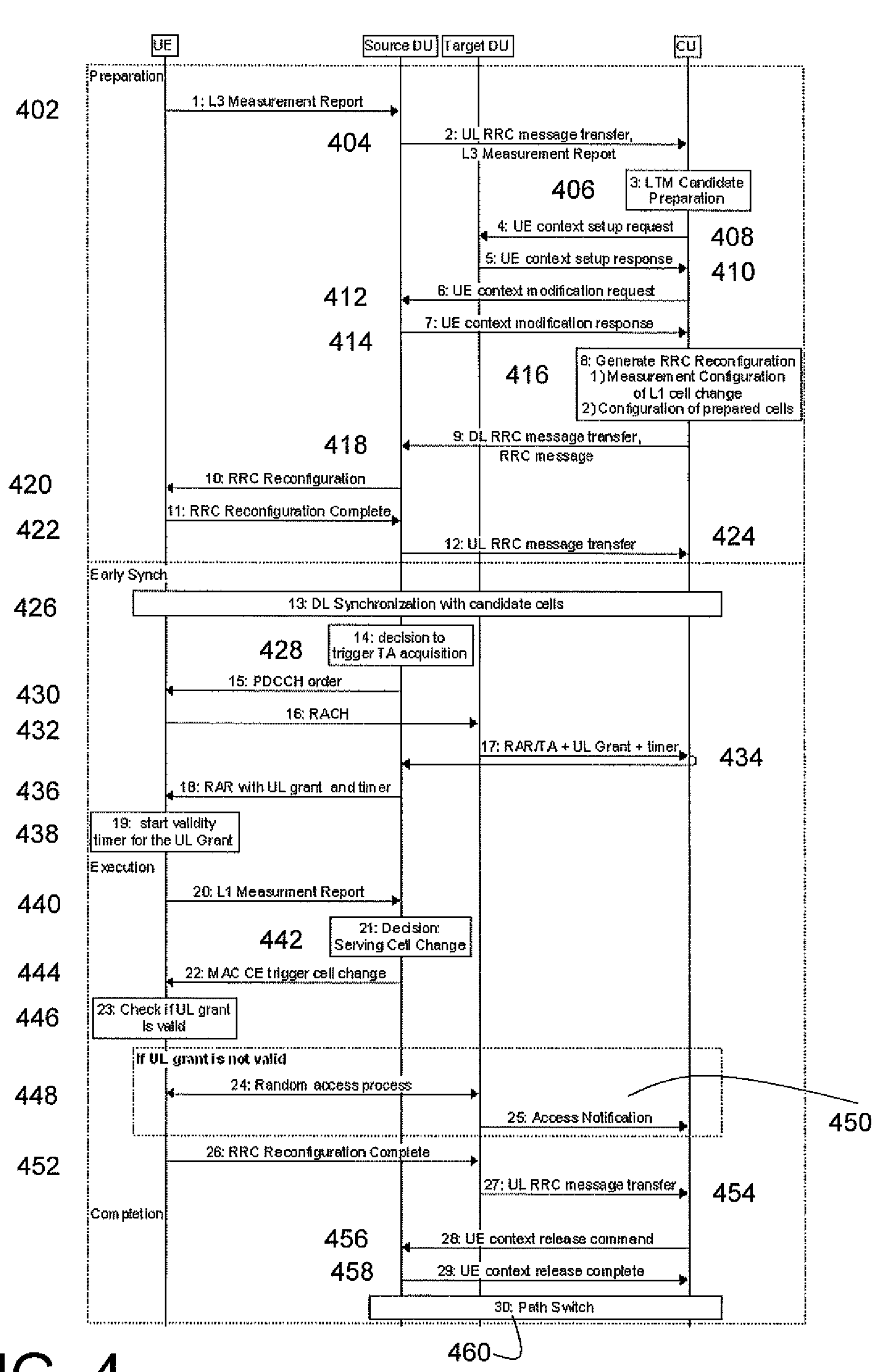
FIG. 4 is a flowchart illustrating steps as described herein.

In an example embodiment, alternative 2, a UE based mechanism may be defined. In alternative 2, a UL grant and a timer may be provided in a RAR. Referring now to FIG. 4, illustrated is an example of signaling for alternative 2. At 402, the UE may transmit, to the source DU, an L3 measurement report. At 404, the source DU may transmit, to the CU, an UL RRC message transfer, which may comprise the L3 measurement report. At 406, the CU may perform LTM candidate preparation. At 408, the CU may transmit, to the target DU, a UE context setup request. At 410, the target DU may transmit, to the CU, a UE context setup response. At 412, the CU may transmit, to the source DU, a UE context modification request. At 414, the source DU may transmit, to the CU, a UE context modification response. At 416, the CU may generate an RRC reconfiguration, which may comprise a measurement configuration of L1 cell change and/or a configuration of prepared cells. At 418, the CU may transmit, to the source DU, a DL RRC message transfer, which may comprise an RRC message, for example the RRC reconfiguration. At 420, the source DU may transmit, to the UE, the RRC reconfiguration. At 422, the UE may transmit, to the source DU, an RRC reconfiguration complete message. At 424, the source DU may transmit, to the CU, an UL RRC message transfer.

At 426, DL synchronization may be performed with candidate cells. At 428, the source DU may decide to trigger TA acquisition. At 430, the source DU may transmit, to the UE, a PDCCH order. At 432, the UE may transmit, to the target DU, RACH. At 434, the target DU may transmit, to the CU, a response containing at least TA, a UL grant, and a timer. The CU may forward this information to the source DU. At 436, the source DU may transmit, to the UE, RAR with UL grant and a timer. At 438, the UE may start a validity timer for the UL grant.

In an example embodiment, after receiving a PDCCH order (e.g. at 430), the UE may transmit a PRACH associated with the given SSB using the RACH occasion and the preamble given in the PDCCH order (e.g. at 432). The UE may monitor for a RAR from the S-DU. The UE may receive the RAR (e.g. at 436) containing a UL grant, an associated expiry timer value (duration of the timer T), TA, etc. The S-DU may receive the UL grant, an associated expiry timer value, TA from the T-DU, etc. (e.g. at 434). The UE may start the timer T after receiving the RAR message from the S-DU (e.g. at 438). For example, the T-DU may start activating the UL grant after it sends the estimated TA plus some delay which may be caused in delivering the TA to the S-DU and then to the UE in the RAR message. In one option, the UE may be configured to start the timer T after a given gap (e.g. X symbols/slots) from the symbol/slot in which the RAR is received. In another option, the UE may be configured to start the timer T after a given gap (e.g. X symbols/slots) from the symbol/slot in which an acknowledgement (HARQ-ACK) is sent by the UE for the received RAR. In another option, the T-DU/S-DU may also provide the UE with additional information on when the UL resources are activated (e.g. starting point of the timer).

In an example embodiment, the UE may be configured to report the received UL resource configurations and validation conditions to the S-DU/CU. In a shorter format, it may indicate whether or not the UL resources have been received.

Referring now to/FIG. 4, at 440, the UE may transmit, to the source DU, an L1 measurement report. At 442, the source DU may make a decision on serving cell change. At 444, the source DU may transmit, to the UE, a MAC CE triggering cell change. At 446, UE may check whether the UL grant is valid.

Optionally, if the UL grant is not valid, at 448, a random access process may be performed between the UE and the target DU. At 450, the target DU may transmit, to the CU, an access notification.

Whether or not the UL grant is valid, at 452, the UE may transmit, to the target DU, an RRC reconfiguration complete message. At 454, the target DU may transmit, to the CU, an UL RRC message transfer. At 456, the CU may transmit, to the source DU, a UE context release command. At 458, the source DU may transmit, to the CU, a UE context release complete message. At 460, path switching may be performed.

In an example embodiment, the timer T may be stopped by the UE when it receives a cell switch command from the S-DU (e.g. 444).

In an example embodiment, the timer T may be stopped (e.g., before 444/446) by the UE when the candidate target cell is released and no longer prepared for LTM switch. In one option, the indication of release of a candidate target cell may be sent by the CU to the UE.

In an example embodiment, the timer T may be stopped (e.g., before 444/446) by the UE when there is any change in the radio condition of the UE with respect to the candidate target cell, for example when the quality of the SSB given the PDCCH order to the UE is below a certain threshold (e.g. the QCL reference of the UL grant cannot be used by the UE due to poor radio conditions).

In an example embodiment, the UE may send an indication to the S-DU that the given UL grant is not valid anymore.

In another example embodiment, the UE may be configured to perform RACH-based cell switch if the candidate target cell is selected as the target cell by the S-DU (e.g. at 448).

In an example embodiment, if the timer T expires (e.g., before 444/446), the UE may send a request to the S-DU (e.g. to increase the validity of the UL grant). The S-DU may send a request to the T-DU for the extension of the UL grant validity. The S-DU may receive a confirmation from the target DU on the validity extension of the timer (with/without the timer value, e.g. a new duration (> the previous duration) may be provided). The S-DU may share the confirmation (with/without the new timer value) with the UE. The UE may re-start the timer after receiving the confirmation from the S-DU.

In another example embodiment, the UE may be configured to perform RACH-based cell switch if the candidate target cell is selected as the target cell by the S-DU (e.g. at 448).

In an example embodiment, the UE may receive a pre-configuration of the UL grant or one or more UL grants (e.g. a set of grants). The RAR (e.g. at 436) may point/indicate to an index value of one or more preconfigured grants. The UL grant may have a specific configured format which may be used for provisioning the grant (e.g. resource/periodicity of the grant etc.). Alternatively, the RAR may indicate whether the at least one preconfigured grant is "active" for the UE. Alternatively, or additionally, the grant may be valid when the UE receives the cell switch command (i.e. reception of the cell switch command may trigger the start of the validity timer of the UL grant).

In an example embodiment, the validity timer for an UL grant may be started upon receiving the cell switch command. If the timer expires before the UE (e.g., successfully) transmits an UL message to the target cell, the UE may be configured to perform the RACH-based cell switch or may declare it an LTM failure and take another action(s) defined to handle an LTM failure scenario.

In another example embodiment, the UE may send a capability indicator on whether the UE can support such timer-based UL grant maintenance or not. The NW may only enable such timer based UL grant maintenance for the UE if the UE capability supports it.

In another example embodiment, the UE may send a capability indicator on the (e.g., maximum) number of UL grant validity timers or candidate target cells for which the timer-based UL grant validity maintenance may be performed whether the UE can support such timer-based UL grant maintenance or not. In a further example embodiment, if at any instant, the number of timers exceeds the maximum UE capability, the UE may stop maintaining the UL grant validity timer for a candidate target cell, e.g., the candidate cell for which the validity timer started first among the current set of candidate target cells for which the UL grant validity timer is running. Alternatively, the UE may stop maintaining the UL grant validity timer which started most recently among the current set of candidate target cells for which the UL grant validity timer is running. Alternatively, the UE may select (e.g., randomly) a currently running UL grant validity timer and stop it. In a further embodiment, more than one UL grant timers (each associated with one UL grant) may be maintained for a candidate target cell. If the number of timers exceeds the maximum UE capability, the UE may stop maintaining one or more running UL grant validity timers which started first or last or select randomly and stop it.

In another example embodiment, the UE may be configured to not reset (i.e. keep storing and maintaining) a valid UL grant for a candidate target cell and the associated SSB even after the cell switch to a target cell. The UL grant for a candidate cell and a SSB before the cell switch may be valid, and may be used after the cell switch for a subsequent cell switch. This may be useful for dynamic switching.

Figure 5:
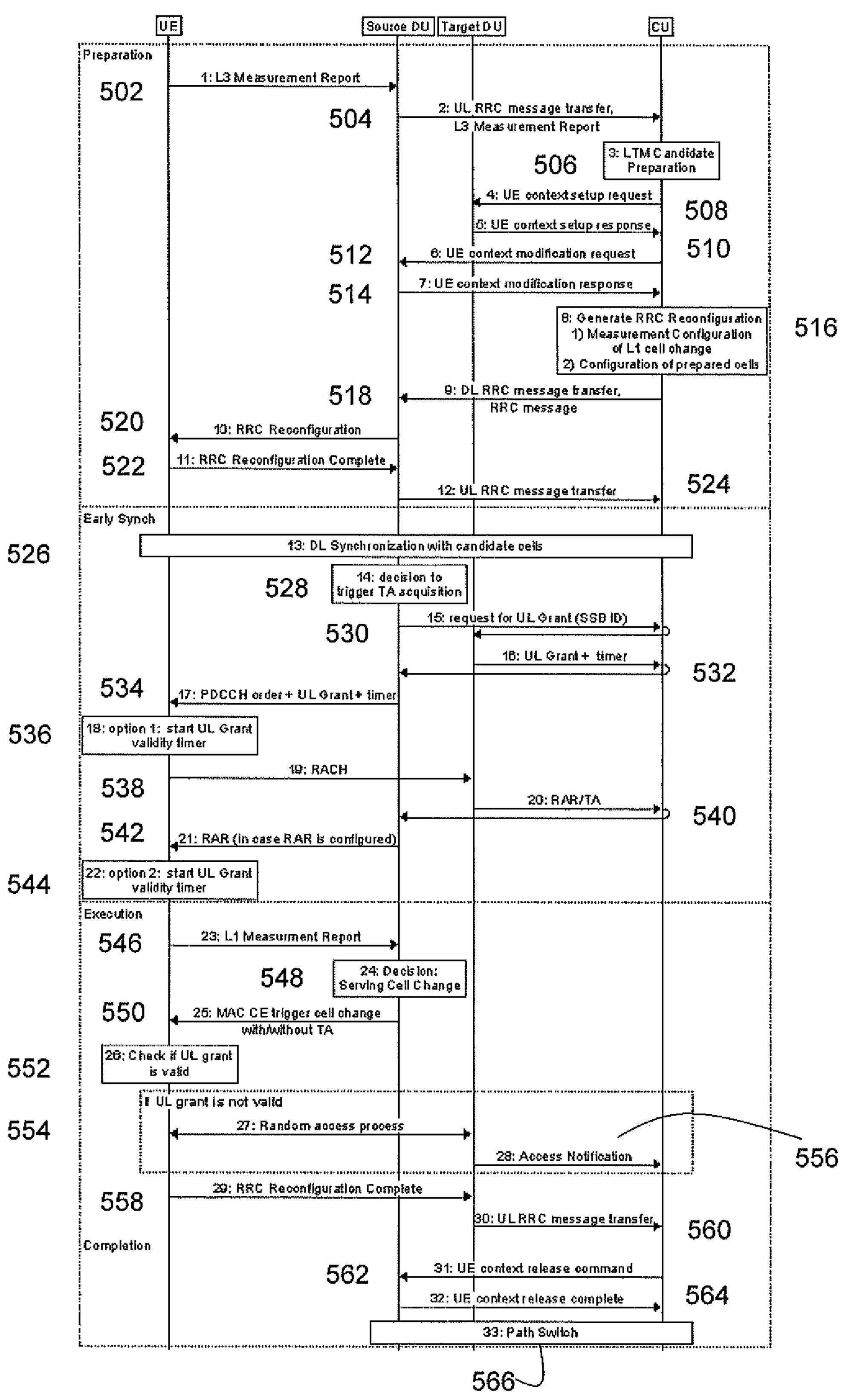
FIG. 5 is a flowchart illustrating steps as described herein.

In an example embodiment, alternative 3, a UE based mechanism may be defined. In alternative 3, a UL grant and a timer may be provided in a PDCCH order. Referring now to FIG. 5, illustrated is an example of signaling for alternative 3. At 502, the UE may transmit, to the source DU, an L3 measurement report. At 504, the source DU may transmit, to the CU, an UL RRC message transfer, which may comprise the L3 measurement report. At 506, the CU may perform LTM candidate preparation. At 508, the CU may transmit, to the target DU, a UE context setup request. At 510, the target DU may transmit, to the CU, a UE context setup response. At 512, the CU may transmit, to the source DU, a UE context modification request. At 514, the source DU may transmit, to the CU, a UE context modification response. At 516, the CU may generate an RRC reconfiguration, which may comprise a measurement configuration of L1 cell change, and/or a configuration of prepared cells. At 518, the CU may transmit, to the source DU, a DL RRC message transfer, which may include an RRC message, for example the RRC reconfiguration. At 520, the source DU may transmit, to the UE, the RRC reconfiguration. At 522, the UE may transmit, to the source UD, an RRC reconfiguration complete message. At 524, the source DU may transmit, to the CU, an UL RRC message transfer.

At 526, DL synchronization with candidate cells may be performed. At 528, the source DU may decide to trigger TA acquisition. At 530, the source DU may transmit, to the CU, a request for UL grant, which may include an SSB ID, one or more measurement reports, or a TCI state ID. The CU may forward the request to the target DU. At 532, the target DU may transmit, to the CU, an UL grant and a timer. The CU may forward this information to the source DU. At 534, the source DU may transmit, to the UE, a PDCCH order, an UL grant, and a timer.

In an example embodiment, the UE may receive a PDCCH order (e.g. at 534) containing a UL grant, an associated expiry timer value (duration of the timer T), other RACH related parameters (SSB index, preamble index, RACH occasion, candidate target cell identity), etc.

In an example embodiment option, after the TA acquisition decision at the S-DU, the S-DU may first request the T-DU to send the UL grant information (UL grant associated with the selected SSB by the S-DU, associated timer value) to the S-DU, and then after receiving the information from the T-DU (e.g. at 532), the S-DU may send the PDCCH order to the UE (e.g. at 534).

In another example embodiment, the S-DU may receive UL grants associated with different SSBs, associated expiry timer values in the preparation phase (e.g. at 512/518).

At 536, in a first option, when RAR is not configured, the UE may be configured to start the timer T after the PRACH transmission plus a given offset (e.g. offset is used to consider the delay at the T-DU in detecting the PRACH, and start activating the UL grant).

At 538, the UE may transmit, to the target DU, RACH. At 540, the target DU may transmit, to the CU, a response containing at least TA. The CU may forward this information to the source DU. At 542, the source DU may transmit, to the UE, RAR, for example in a case where RAR is configured.

At 544, in a second option, when RAR is configured, the UE may start the timer T after sending the PRACH transmission and receiving the associated RAR (e.g. the T-DU may start activating the UL grant after it sends the estimated TA plus some delay which may be caused in delivering the TA to the S-DU and then to the UE in the RAR message).

In an example embodiment, the remaining UE procedure for stopping the timer and UE actions on the time expiration may be the same as in the alternative 2.

At 546, the UE may transmit, to the source DU, an L1 measurement report. At 548, the source DU may decide on serving cell change. At 550, the source DU may transmit, to the UE, a MAC CE triggering cell change with or without TA. At 552, the UE may check if the UL grant is valid. If the UL grant is not valid, at 554 a random access process may be performed between the UE and the target DU. At 556, the target DU may transmit, to the CU, an access notification.

Whether or not the UL grant is valid, at 558 the UE may transmit, to the target DU, an RRC reconfiguration complete message. At 560, the target DU may transmit, to the CU, an UL RRC message transfer. At 562, the CU may transmit, to the source DU, a UE context release command. At 564, the source DU may transmit, to the CU, a UE context release complete message. At 566, path switching may be performed.

In an example embodiment, the UE may receive preconfiguration of the UL grant or one or more UL grants (e.g. a set of grants). The PDCCH may point/indicate to an index value of one or more preconfigured grants. The UL grant may have a specific configured format which may be used for provisioning the grant (e.g. resource/periodicity of the grant etc.). Alternatively, the PDCCH may indicate whether the at least one preconfigured grant is “active” for the UE. Alternatively, or additionally, the grant may be valid when the UE receives the cell switch command (i.e. it may trigger the start of the timer).

A technical effect of example embodiments of the present disclosure may be to reduce the time period of unnecessary resource allocation in target cell for sending RRC Reconfiguration complete in target cell after cell change.

A technical effect of example embodiments of the present disclosure may be to enable single release of UL grant resource for the UE in the target DU.

Figure 6:
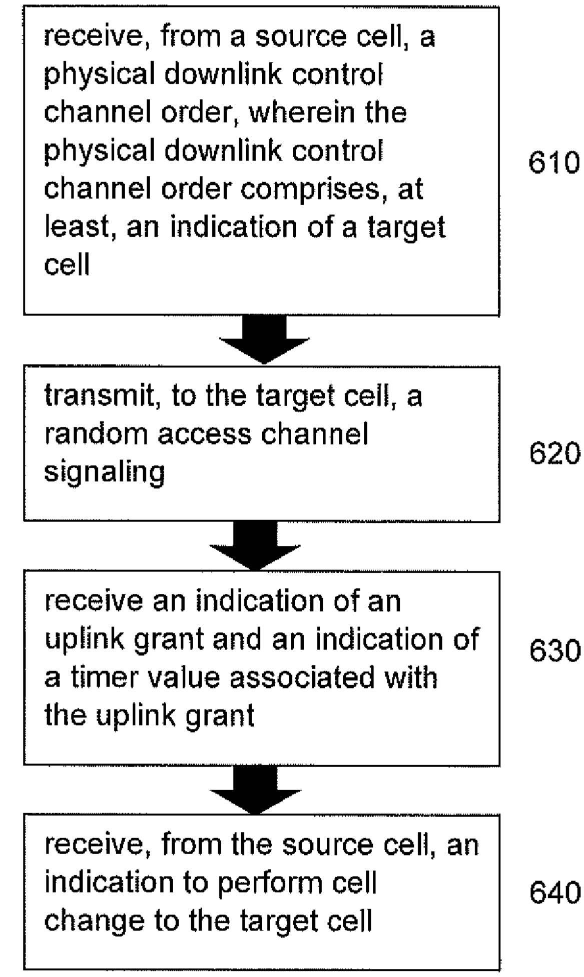
FIG. 6 is a flowchart illustrating steps as described herein.

FIG. 6 illustrates the potential steps of an example method 600. The example method 600 may include: receiving, from a source cell, a physical downlink control channel order, wherein the physical downlink control channel order comprises, at least, an indication of a target cell, 610; transmitting, to the target cell, a random access channel signaling, 620; receiving an indication of an uplink grant and an indication of a timer value associated with the uplink grant, 630; and receiving, from the source cell, an indication to perform cell change to the target cell, 640. The example method 800 may be performed, for example, with a user equipment.

FIG. 7 illustrates the potential steps of an example method 700. The example method 700 may include: transmitting, to a user equipment, a physical downlink control channel order, wherein the physical downlink control channel order comprises, at least, an indication of a target cell, 710; receiving, from a centralized unit, an indication of an uplink grant and an indication of a timer value associated with the uplink grant, wherein the uplink grant and the timer are associated with the target cell, 720; starting a validity timer for the uplink grant based, at least partially, on the timer value, 730; and transmitting, to the user equipment, at least the indication of the uplink grant, 740. The example method 700 may be performed, for example, with a network node, a base station, a source DU, a source cell, etc.

Figure 8:
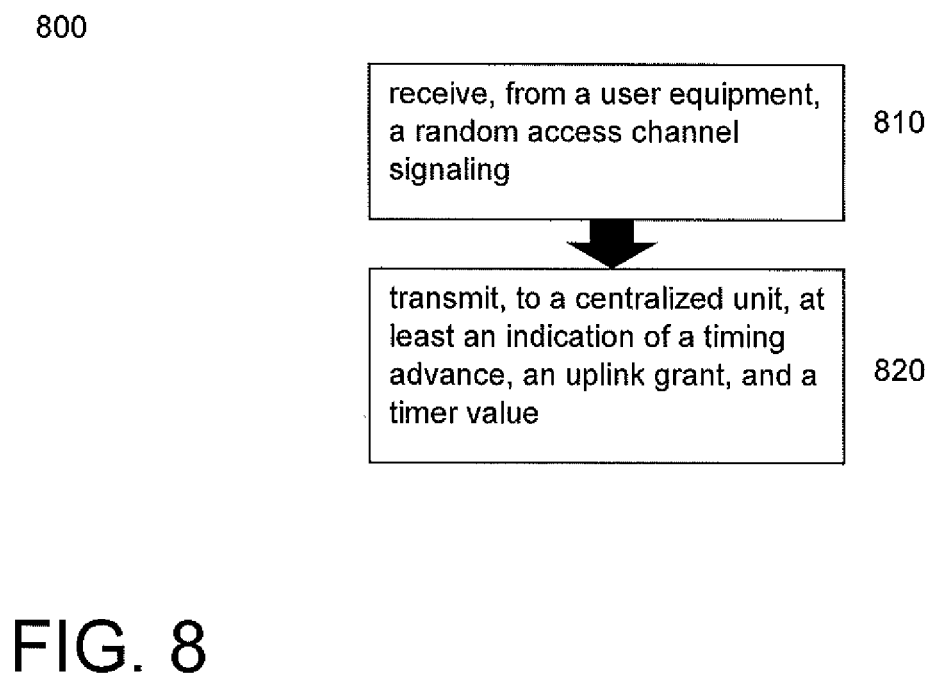

FIG. 8 illustrates the potential steps of an example method 800. The example method 800 may include: receiving, from a user equipment, a random access channel signaling, 810; and transmitting, to a centralized unit, at least an indication of a timing advance, an uplink grant, and a timer value, 820. The example method 800 may be performed, for example, with a network node, a base station, a target DU, a target cell, etc.

In accordance with one example embodiment, an apparatus may comprise: at least one processor; and at least one memory storing instructions that, when executed by the at least one processor, cause the apparatus at least to: receive, from a source cell, a physical downlink control channel order, wherein the physical downlink control channel order may comprise, at least, an indication of a target cell; transmit, to the target cell, a random access channel signaling; receive an indication of an uplink grant and an indication of a timer value associated with the uplink grant; and receive, from the source cell, an indication to perform cell change to the target cell.

The example apparatus may be further configured to: transmit, to the source cell, an indication of a capability of the apparatus to maintain at least one timer for a plurality of candidate target cells associated with the uplink grant.

The example apparatus may be further configured to: start a validity timer for the uplink grant based, at least partially, on the timer value, wherein the physical downlink control channel order may comprise, at least, the indication of the uplink grant and the indication of the timer value, wherein the validity timer may be started at a time determined based, at least partially, on receiving the physical downlink control channel order; and in response to the indication to perform cell change to the target cell, determine whether the uplink grant is valid based, at least partially, on the validity timer.

The example apparatus may be further configured to: stop the validity timer in response to at least one of: the received indication to perform cell change to the target cell, or a determined change in a radio condition with respect to the target cell.

The example apparatus may be further configured to: perform cell change to the target cell; and at least one of: maintain the validity timer, maintain the uplink grant, or maintain a synchronization signal block associated with the uplink grant, after the cell change to the target cell.

The example apparatus may be further configured to: in response to a determination that the validity timer has expired, transmit a request to extend the validity timer; receive one of: an indication to extend the validity timer, or a further uplink grant and a further timer value; and reset the validity timer based, at least partially, on the one of the indication to extend the validity timer, or the further timer value.

The example apparatus may be further configured to: receive a random access response to the random access channel signaling, wherein the random access response may comprise, at least, the indication of the uplink grant and the indication of the timer value; start a validity timer for the uplink grant based, at least partially, on the timer value, wherein the validity timer may be started at a time determined based, at least partially, on receiving the random access response; and in response to the indication to perform cell change to the target cell, determine whether the uplink grant is valid based, at least partially, on the validity timer.

The example apparatus may be further configured to: determine whether the uplink grant is valid based, at least partially, on the timer value and at least one quasi colocation reference.

The random access channel signaling may comprise, at least, a request for the uplink grant.

The example apparatus may be further configured to: start a validity timer for the uplink grant based, at least partially, on the timer value; and in response to the indication to perform cell change to the target cell, determine whether the uplink grant is valid based, at least partially, on the validity timer.

The validity timer may be further based on at least one of: a delay value, a number of symbols configured to be skipped, a number of slots configured to be skipped, a starting time for the validity timer, or a reception of a cell switch command.

The example apparatus may be further configured to: stop the validity timer in response to a determination that the target cell has been released.

In accordance with one aspect, an example method may be provided comprising: receiving, with a user equipment from a source cell, a physical downlink control channel order, wherein the physical downlink control channel order may comprise, at least, an indication of a target cell; transmitting, to the target cell, a random access channel signaling; receiving an indication of an uplink grant and an indication of a timer value associated with the uplink grant; and receiving, from the source cell, an indication to perform cell change to the target cell.

The example method may further comprise: transmitting, to the source cell, an indication of a capability of the apparatus to maintain at least one timer for a plurality of candidate target cells associated with the uplink grant.

The example method may further comprise: starting a validity timer for the uplink grant based, at least partially, on the timer value, wherein the physical downlink control channel order may comprise, at least, the indication of the uplink grant and the indication of the timer value, wherein the validity timer may be started at a time determined based, at least partially, on receiving the physical downlink control channel order; and in response to the indication to perform cell change to the target cell, determining whether the uplink grant is valid based, at least partially, on the validity timer.

The example method may further comprise: stopping the validity timer in response to at least one of: the received indication to perform cell change to the target cell, or a determined change in a radio condition with respect to the target cell.

The example method may further comprise: performing cell change to the target cell; and at least one of: maintaining the validity timer, maintaining the uplink grant, or maintaining a synchronization signal block associated with the uplink grant, after the cell change to the target cell.

The example method may further comprise: in response to a determination that the validity timer has expired, transmitting a request to extend the validity timer; receiving one of: an indication to extend the validity timer, or a further uplink grant and a further timer value; and resetting the validity timer based, at least partially, on the one of the indication to extend the validity timer, or the further timer value.

The example method may further comprise: receiving a random access response to the random access channel signaling, wherein the random access response may comprise, at least, the indication of the uplink grant and the indication of the timer value; starting a validity timer for the uplink grant based, at least partially, on the timer value, wherein the validity timer may be started at a time determined based, at least partially, on receiving the random access response; and in response to the indication to perform cell change to the target cell, determining whether the uplink grant is valid based, at least partially, on the validity timer.

The example method may further comprise: determining whether the uplink grant is valid based, at least partially, on the timer value and at least one quasi co-location reference.

The random access channel signaling may comprise, at least, a request for the uplink grant.

The example method may further comprise: starting a validity timer for the uplink grant based, at least partially, on the timer value; and in response to the indication to perform cell change to the target cell, determining whether the uplink grant is valid based, at least partially, on the validity timer.

The validity timer may be further based on at least one of: a delay value, a number of symbols configured to be skipped, a number of slots configured to be skipped, a starting time for the validity timer, or a reception of a cell switch command.

The example method may further comprise: stopping the validity timer in response to a determination that the target cell has been released.

In accordance with one example embodiment, an apparatus may comprise: circuitry configured to perform: receiving, from a source cell, a physical downlink control channel order, wherein the physical downlink control channel order may comprise, at least, an indication of a target cell; circuitry configured to perform: transmitting, to the target cell, a random access channel signaling; circuitry configured to perform: receiving an indication of an uplink grant and an indication of a timer value associated with the uplink grant; and circuitry configured to perform: receiving, from the source cell, an indication to perform cell change to the target cell.

In accordance with one example embodiment, an apparatus may comprise: processing circuitry; memory circuitry including computer program code, the memory circuitry and the computer program code configured to, with the processing circuitry, enable the apparatus to: receive, from a source cell, a physical downlink control channel order, wherein the physical downlink control channel order may comprise, at least, an indication of a target cell; transmit, to the target cell, a random access channel signaling; receive an indication of an uplink grant and an indication of a timer value associated with the uplink grant; and receive, from the source cell, an indication to perform cell change to the target cell.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving, from a source cell, a physical downlink control channel order, wherein the physical downlink control channel order may comprise, at least, an indication of a target cell; transmitting, to the target cell, a random access channel signaling; receiving an indication of an uplink grant and an indication of a timer value associated with the uplink grant; and receiving, from the source cell, an indication to perform cell change to the target cell.

The means may be further configured to perform: transmitting, to the source cell, an indication of a capability of the apparatus to maintain at least one timer for a plurality of candidate target cells associated with the uplink grant.

The means may be further configured to perform: starting a validity timer for the uplink grant based, at least partially, on the timer value, wherein the physical downlink control channel order may comprise, at least, the indication of the uplink grant and the indication of the timer value, wherein the validity timer may be started at a time determined based, at least partially, on receiving the physical downlink control channel order; and in response to the indication to perform cell change to the target cell, determining whether the uplink grant is valid based, at least partially, on the validity timer.

The means may be further configured to perform: stopping the validity timer in response to at least one of: the received indication to perform cell change to the target cell, or a determined change in a radio condition with respect to the target cell.

The means may be further configured to perform: cell change to the target cell; and at least one of: maintaining the validity timer, maintaining the uplink grant, or maintaining a synchronization signal block associated with the uplink grant, after the cell change to the target cell.

The means may be further configured to perform: in response to a determination that the validity timer has expired, transmitting a request to extend the validity timer; receiving one of: an indication to extend the validity timer, or a further uplink grant and a further timer value; and resetting the validity timer based, at least partially, on the one of the indication to extend the validity timer, or the further timer value.

The means may be further configured to perform: receiving a random access response to the random access channel signaling, wherein the random access response may comprise, at least, the indication of the uplink grant and the indication of the timer value; starting a validity timer for the uplink grant based, at least partially, on the timer value, wherein the validity timer may be started at a time determined based, at least partially, on receiving the random access response; and in response to the indication to perform cell change to the target cell, determining whether the uplink grant is valid based, at least partially, on the validity timer.

The means may be further configured to perform: determining whether the uplink grant is valid based, at least partially, on the timer value and at least one quasi co-location reference.

The random access channel signaling may comprise, at least, a request for the uplink grant.

The means may be further configured to perform: starting a validity timer for the uplink grant based, at least partially, on the timer value; and in response to the indication to perform cell change to the target cell, determining whether the uplink grant is valid based, at least partially, on the validity timer.

The validity timer may be further based on at least one of: a delay value, a number of symbols configured to be skipped, a number of slots configured to be skipped, a starting time for the validity timer, or a reception of a cell switch command.

The means may be further configured to perform: stopping the validity timer in response to a determination that the target cell has been released.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause receiving, from a source cell, of a physical downlink control channel order, wherein the physical downlink control channel order may comprise, at least, an indication of a target cell; cause transmitting, to the target cell, of a random access channel signaling; cause receiving of an indication of an uplink grant and an indication of a timer value associated with the uplink grant; and cause receiving, from the source cell, of an indication to perform cell change to the target cell.

In accordance with one example embodiment, a non-transitory computer-readable medium comprising program instructions stored thereon for performing at least the following: causing receiving, from a source cell, of a physical downlink control channel order, wherein the physical downlink control channel order may comprise, at least, an indication of a target cell; causing transmitting, to the target cell, of a random access channel signaling; causing receiving of an indication of an uplink grant and an indication of a timer value associated with the uplink grant; and causing receiving, from the source cell, of an indication to perform cell change to the target cell.

In accordance with another example embodiment, a non-transitory program storage device readable by a machine may be provided, tangibly embodying instructions executable by the machine for performing operations, the operations comprising: causing receiving, from a source cell, of a physical downlink control channel order, wherein the physical downlink control channel order may comprise, at least, an indication of a target cell; causing transmitting, to the target cell, of a random access channel signaling; causing receiving of an indication of an uplink grant and an indication of a timer value associated with the uplink grant; and causing receiving, from the source cell, of an indication to perform cell change to the target cell.

In accordance with another example embodiment, a non-transitory computer-readable medium comprising instructions that, when executed by an apparatus, cause the apparatus to perform at least the following: causing receiving, from a source cell, of a physical downlink control channel order, wherein the physical downlink control channel order may comprise, at least, an indication of a target cell; causing transmitting, to the target cell, of a random access channel signaling; causing receiving of an indication of an uplink grant and an indication of a timer value associated with the uplink grant; and causing receiving, from the source cell, of an indication to perform cell change to the target cell.

A computer implemented system comprising: at least one processor and at least one non-transitory memory storing instructions that, when executed by the at least one processor, cause the system at least to perform: causing receiving, from a source cell, of a physical downlink control channel order, wherein the physical downlink control channel order may comprise, at least, an indication of a target cell; causing transmitting, to the target cell, of a random access channel signaling; causing receiving of an indication of an uplink grant and an indication of a timer value associated with the uplink grant; and causing receiving, from the source cell, of an indication to perform cell change to the target cell.

A computer implemented system comprising: means for causing receiving, from a source cell, of a physical downlink control channel order, wherein the physical downlink control channel order may comprise, at least, an indication of a target cell; causing transmitting, to the target cell, of a random access channel signaling; means for causing receiving of an indication of an uplink grant and an indication of a timer value associated with the uplink grant; and means for causing receiving, from the source cell, of an indication to perform cell change to the target cell.

In accordance with one example embodiment, an apparatus may comprise: at least one processor; and at least one memory storing instructions that, when executed by the at least one processor, cause the apparatus at least to: transmit, to a user equipment, a physical downlink control channel order, wherein the physical downlink control channel order may comprise, at least, an indication of a target cell; receive, from a centralized unit, an indication of an uplink grant and an indication of a timer value associated with the uplink grant, wherein the uplink grant and the timer may be associated with the target cell; start a validity timer for the uplink grant based, at least partially, on the timer value; and transmit, to the user equipment, at least the indication of the uplink grant.

The example apparatus may be further configured to: receive, from the user equipment, an indication of a capability of the user equipment to maintain at least one timer for a plurality of candidate target cells associated with the uplink grant.

The example apparatus may be further configured to: determine whether the uplink grant is valid based, at least partially, on the timer value and at least one quasi co-location reference.

The example apparatus may be further configured to: receive, from the user equipment, at least one layer one measurement report; determine a change in at least one radio condition of the user equipment with respect to the target cell based, at least partially, on the at least one received layer one measurement report; and in response to the determined change, at least one of: stop the validity timer; transmit, to the user equipment, a further physical downlink control channel order; transmit, to the user equipment, an indication to perform a random access channel based cell switch; or transmit, to the target cell, a request to update the uplink grant.

The example apparatus may be further configured to: stop the validity timer in response to a determination that the target cell has been released.

The example apparatus may be further configured to: in response to a determination that the validity timer has expired, transmit a request to extend the validity timer; receive one of: an indication to extend the validity timer, or a further uplink grant and a further timer value; and reset the validity timer based, at least partially, on the one of the indication to extend the validity timer, or the further timer value.

The request to extend the validity timer may be further based on a quality of a radio link between the user equipment and the target cell.

The example apparatus may be further configured to: in response to a determination that the uplink grant is valid, transmit, to the user equipment, an indication to perform the cell change with the uplink grant; and stop the validity timer.

The validity timer may further be based on at least one of: a delay value, or a received time to start the validity timer.

The example apparatus may be further configured to: transmit, to at least one further candidate target cell, at least one of: an indication to release at least one further uplink grant reserved for the user equipment, or an indication of the uplink grant.

The example apparatus may be further configured to: transmit a request for the uplink grant.

The request for the uplink grant may comprise an indication of a proposed resource configuration, wherein the proposed resource configuration may comprise at least one of: a number of resources, a time domain for the resources, a frequency domain for the resources, a periodicity for the resources, a length of time for validity of the resources, a time to start reservation of the resources, or a time to end the reservation of the resources.

In accordance with one aspect, an example method may be provided comprising: transmitting, with a network node to a user equipment, a physical downlink control channel order, wherein the physical downlink control channel order may comprise, at least, an indication of a target cell; receiving, from a centralized unit, an indication of an uplink grant and an indication of a timer value associated with the uplink grant, wherein the uplink grant and the timer may be associated with the target cell; starting a validity timer for the uplink grant based, at least partially, on the timer value; and transmitting, to the user equipment, at least the indication of the uplink grant.

The example method may further comprise: receiving, from the user equipment, an indication of a capability of the user equipment to maintain at least one timer for a plurality of candidate target cells associated with the uplink grant.

The example method may further comprise: determining whether the uplink grant is valid based, at least partially, on the timer value and at least one quasi co-location reference.

The example method may further comprise: receiving, from the user equipment, at least one layer one measurement report; determining a change in at least one radio condition of the user equipment with respect to the target cell based, at least partially, on the at least one received layer one measurement report; and in response to the determined change, at least one of: stopping the validity timer; transmitting, to the user equipment, a further physical downlink control channel order; transmitting, to the user equipment, an indication to perform a random access channel based cell switch; or transmitting, to the target cell, a request to update the uplink grant.

The example method may further comprise: stopping the validity timer in response to a determination that the target cell has been released.

The example method may further comprise: in response to a determination that the validity timer has expired, transmitting a request to extend the validity timer; receiving one of: an indication to extend the validity timer, or a further uplink grant and a further timer value; and resetting the validity timer based, at least partially, on the one of the indication to extend the validity timer, or the further timer value.

The request to extend the validity timer may further be based on a quality of a radio link between the user equipment and the target cell.

The example method may further comprise: in response to a determination that the uplink grant is valid, transmitting, to the user equipment, an indication to perform the cell change with the uplink grant; and stopping the validity timer.

The validity timer may be further based on at least one of: a delay value, or a received time to start the validity timer.

The example method may further comprise: transmitting, to at least one further candidate target cell, at least one of: an indication to release at least one further uplink grant reserved for the user equipment, or an indication of the uplink grant.

The example method may further comprise: transmitting a request for the uplink grant.

The request for the uplink grant may comprise an indication of a proposed resource configuration, wherein the proposed resource configuration may comprise at least one of: a number of resources, a time domain for the resources, a frequency domain for the resources, a periodicity for the resources, a length of time for validity of the resources, a time to start reservation of the resources, or a time to end the reservation of the resources.

In accordance with one example embodiment, an apparatus may comprise: circuitry configured to perform: transmitting, to a user equipment, a physical downlink control channel order, wherein the physical downlink control channel order may comprise, at least, an indication of a target cell; circuitry configured to perform: receiving, from a centralized unit, an indication of an uplink grant and an indication of a timer value associated with the uplink grant, wherein the uplink grant and the timer may be associated with the target cell; circuitry configured to perform: starting a validity timer for the uplink grant based, at least partially, on the timer value; and circuitry configured to perform: transmitting, to the user equipment, at least the indication of the uplink grant.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a physical downlink control channel order, wherein the physical downlink control channel order may comprise, at least, an indication of a target cell; receive, from a centralized unit, an indication of an uplink grant and an indication of a timer value associated with the uplink grant, wherein the uplink grant and the timer may be associated with the target cell; start a validity timer for the uplink grant based, at least partially, on the timer value; and transmit, to the user equipment, at least the indication of the uplink grant.

In accordance with one example embodiment, an apparatus may comprise means for performing: transmitting, to a user equipment, a physical downlink control channel order, wherein the physical downlink control channel order may comprise, at least, an indication of a target cell; receiving, from a centralized unit, an indication of an uplink grant and an indication of a timer value associated with the uplink grant, wherein the uplink grant and the timer may be associated with the target cell; starting a validity timer for the uplink grant based, at least partially, on the timer value; and transmitting, to the user equipment, at least the indication of the uplink grant.

The means may be further configured to perform: receiving, from the user equipment, an indication of a capability of the user equipment to maintain at least one timer for a plurality of candidate target cells associated with the uplink grant.

The means may be further configured to perform: determining whether the uplink grant is valid based, at least partially, on the timer value and at least one quasi co-location reference.

The example means may be further configured to perform: receiving, from the user equipment, at least one layer one measurement report; determining a change in at least one radio condition of the user equipment with respect to the target cell based, at least partially, on the at least one received layer one measurement report; and in response to the determined change, at least one of: stopping the validity timer; transmitting, to the user equipment, a further physical downlink control channel order; transmitting, to the user equipment, an indication to perform a random access channel based cell switch; or transmitting, to the target cell, a request to update the uplink grant.

The example means may be further configured to perform: stopping the validity timer in response to a determination that the target cell has been released.

The means may be further configured to perform: in response to a determination that the validity timer has expired, transmitting a request to extend the validity timer; receiving one of: an indication to extend the validity timer, or a further uplink grant and a further timer value; and resetting the validity timer based, at least partially, on the one of the indication to extend the validity timer, or the further timer value.

The request to extend the validity timer may further be based on a quality of a radio link between the user equipment and the target cell.

The example means may be further configured to perform: in response to a determination that the uplink grant is valid, transmitting, to the user equipment, an indication to perform the cell change with the uplink grant; and stopping the validity timer.

The validity timer may be further based on at least one of: a delay value, or a received time to start the validity timer.

The means may be further configured to perform: transmitting, to at least one further candidate target cell, at least one of: an indication to release at least one further uplink grant reserved for the user equipment, or an indication of the uplink grant.

The means may be further configured to perform: transmitting a request for the uplink grant.

The request for the uplink grant may comprise an indication of a proposed resource configuration, wherein the proposed resource configuration may comprise at least one of: a number of resources, a time domain for the resources, a frequency domain for the resources, a periodicity for the resources, a length of time for validity of the resources, a time to start reservation of the resources, or a time to end the reservation of the resources.

In accordance with one example embodiment, a non-transitory computer-readable medium comprising instructions stored thereon which, when executed with at least one processor, cause the at least one processor to: cause transmitting, to a user equipment, of a physical downlink control channel order, wherein the physical downlink control channel order may comprise, at least, an indication of a target cell; cause receiving, from a centralized unit, of an indication of an uplink grant and an indication of a timer value associated with the uplink grant, wherein the uplink grant and the timer may be associated with the target cell; start a validity timer for the uplink grant based, at least partially, on the timer value; and cause transmitting, to the user equipment, of at least the indication of the uplink grant.

In accordance with one example embodiment, a non-transitory computer-readable medium comprising program instructions stored thereon for performing at least the following: causing transmitting, to a user equipment, of a physical downlink control channel order, wherein the physical downlink control channel order may comprise, at least, an indication of a target cell; causing receiving, from a centralized unit, of an indication of an uplink grant and an indication of a timer value associated with the uplink grant, wherein the uplink grant and the timer may be associated with the target cell; starting a validity timer for the uplink grant based, at least partially, on the timer value; and causing transmitting, to the user equipment, of at least the indication of the uplink grant.

In accordance with another example embodiment, a non-transitory program storage device readable by a machine may be provided, tangibly embodying instructions executable by the machine for performing operations, the operations comprising: causing transmitting, to a user equipment, of a physical downlink control channel order, wherein the physical downlink control channel order may comprise, at least, an indication of a target cell; causing receiving, from a centralized unit, of an indication of an uplink grant and an indication of a timer value associated with the uplink grant, wherein the uplink grant and the timer may be associated with the target cell; starting a validity timer for the uplink grant based, at least partially, on the timer value; and causing transmitting, to the user equipment, of at least the indication of the uplink grant.

In accordance with another example embodiment, a non-transitory computer-readable medium comprising instructions that, when executed by an apparatus, cause the apparatus to perform at least the following: causing transmitting, to a user equipment, of a physical downlink control channel order, wherein the physical downlink control channel order may comprise, at least, an indication of a target cell; causing receiving, from a centralized unit, of an indication of an uplink grant and an indication of a timer value associated with the uplink grant, wherein the uplink grant and the timer may be associated with the target cell; starting a validity timer for the uplink grant based, at least partially, on the timer value; and causing transmitting, to the user equipment, of at least the indication of the uplink grant.

A computer implemented system comprising: at least one processor and at least one non-transitory memory storing instructions that, when executed by the at least one processor, cause the system at least to perform: causing transmitting, to a user equipment, of a physical downlink control channel order, wherein the physical downlink control channel order may comprise, at least, an indication of a target cell; causing receiving, from a centralized unit, of an indication of an uplink grant and an indication of a timer value associated with the uplink grant, wherein the uplink grant and the timer may be associated with the target cell; starting a validity timer for the uplink grant based, at least partially, on the timer value; and causing transmitting, to the user equipment, of at least the indication of the uplink grant.

A computer implemented system comprising: means for causing transmitting, to a user equipment, of a physical downlink control channel order, wherein the physical downlink control channel order may comprise, at least, an indication of a target cell; means for causing receiving, from a centralized unit, of an indication of an uplink grant and an indication of a timer value associated with the uplink grant, wherein the uplink grant and the timer may be associated with the target cell; means for starting a validity timer for the uplink grant based, at least partially, on the timer value; and means for causing transmitting, to the user equipment, of at least the indication of the uplink grant.

In accordance with one example embodiment, an apparatus may comprise: at least one processor; and at least one memory storing instructions that, when executed by the at least one processor, cause the apparatus at least to: receive, from a user equipment, a random access channel signaling; and transmit, to a centralized unit, at least an indication of a timing advance, an uplink grant, and a timer value.

The example apparatus may be further configured to: receive a request to extend a validity timer; and in response to the received request, transmit at least one of: an indication to extend the validity timer, or a further uplink grant and a further timer value.

The example apparatus may be further configured to: receive a request for the uplink grant.

The request for the uplink grant may comprise an indication of a proposed resource configuration, wherein the proposed resource configuration may comprise at least one of: a number of resources, a time domain for the resources, a frequency domain for the resources, a periodicity for the resources, a length of time for validity of the resources, a time to start reservation of the resources, or a time to end the reservation of the resources.

The example apparatus may be further configured to: receive a request to update the uplink grant.

The example apparatus may be further configured to: provide a time to start a validity timer using the timer value.

In accordance with one aspect, an example method may be provided comprising: receiving, with a network node from a user equipment, a random access channel signaling; and transmitting, to a centralized unit, at least an indication of a timing advance, an uplink grant, and a timer value.

The example method may further comprise: receiving a request to extend a validity timer; and in response to the received request, transmitting at least one of: an indication to extend the validity timer, or a further uplink grant and a further timer value.

The example method may further comprise: receiving a request for the uplink grant.

The request for the uplink grant may comprise an indication of a proposed resource configuration, wherein the proposed resource configuration may comprise at least one of: a number of resources, a time domain for the resources, a frequency domain for the resources, a periodicity for the resources, a length of time for validity of the resources, a time to start reservation of the resources, or a time to end the reservation of the resources.

The example method may further comprise: receiving a request to update the uplink grant.

The example method may further comprise: providing a time to start a validity timer using the timer value.

In accordance with one example embodiment, an apparatus may comprise: circuitry configured to perform: receiving, with a network node from a user equipment, a random access channel signaling; and circuitry configured to perform: transmitting, to a centralized unit, at least an indication of a timing advance, an uplink grant, and a timer value.

In accordance with one example embodiment, an apparatus may comprise: processing circuitry; memory circuitry including computer program code, the memory circuitry and the computer program code configured to, with the processing circuitry, enable the apparatus to: receive, from a user equipment, a random access channel signaling; and transmit, to a centralized unit, at least an indication of a timing advance, an uplink grant, and a timer value.

In accordance with one example embodiment, an apparatus may comprise means for performing: receiving, from a user equipment, a random access channel signaling; and transmitting, to a centralized unit, at least an indication of a timing advance, an uplink grant, and a timer value.

The means may be further configured to perform: receiving a request to extend a validity timer; and in response to the received request, transmitting at least one of: an indication to extend the validity timer, or a further uplink grant and a further timer value.

The means may be further configured to perform: receiving a request for the uplink grant.

The request for the uplink grant may comprise an indication of a proposed resource configuration, wherein the proposed resource configuration may comprise at least one of: a number of resources, a time domain for the resources, a frequency domain for the resources, a periodicity for the resources, a length of time for validity of the resources, a time to start reservation of the resources, or a time to end the reservation of the resources.

The means may be further configured to perform: receiving a request to update the uplink grant.

The means may be further configured to perform: providing a time to start a validity timer using the timer value.

In accordance with one example embodiment, a non-transitory computer-readable medium comprising instructions stored thereon which, when executed with at least one processor, cause the at least one processor to: cause receiving, from a user equipment, of a random access channel signaling; and cause transmitting, to a centralized unit, of at least an indication of a timing advance, an uplink grant, and a timer value.

In accordance with one example embodiment, a non-transitory computer-readable medium comprising program instructions stored thereon for performing at least the following: causing receiving, from a user equipment, of a random access channel signaling; and causing transmitting, to a centralized unit, of at least an indication of a timing advance, an uplink grant, and a timer value.

In accordance with another example embodiment, a non-transitory program storage device readable by a machine may be provided, tangibly embodying instructions executable by the machine for performing operations, the operations comprising: causing receiving, from a user equipment, of a random access channel signaling; and causing transmitting, to a centralized unit, of at least an indication of a timing advance, an uplink grant, and a timer value.

In accordance with another example embodiment, a non-transitory computer-readable medium comprising instructions that, when executed by an apparatus, cause the apparatus to perform at least the following: causing receiving, from a user equipment, of a random access channel signaling; and causing transmitting, to a centralized unit, of at least an indication of a timing advance, an uplink grant, and a timer value.

A computer implemented system comprising: at least one processor and at least one non-transitory memory storing instructions that, when executed by the at least one processor, cause the system at least to perform: causing receiving, from a user equipment, of a random access channel signaling; and causing transmitting, to a centralized unit, of at least an indication of a timing advance, an uplink grant, and a timer value.

A computer implemented system comprising: means for causing receiving, from a user equipment, of a random access channel signaling; and means for causing transmitting, to a centralized unit, of at least an indication of a timing advance, an uplink grant, and a timer value.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:

at least one processor; and at least one memory storing instructions that, when executed with the at least one processor, cause the apparatus at least to:

receive, from a source cell, a physical downlink control channel order, wherein the physical downlink control channel order comprises, at least, an indication of a target cell;

transmit, to the target cell, a random access channel signaling;

receive an indication of an uplink grant and an indication of a timer value associated with the uplink grant, wherein the indication of the uplink grant and the indication of the timer value are received via a random access response to the random access channel signaling;

receive, from the source cell, an indication to perform cell change to the target cell;

transmit, to the source cell, an indication of a capability of the apparatus to maintain at least one timer for a plurality of candidate target cells associated with the uplink grant;

receive the random access response to the random access channel signaling, wherein the random access response comprises, at least, the indication of the uplink grant and the indication of the timer value, wherein the random access response further comprises a timing advance value for the target cell;

start a validity timer for the uplink grant based, at least partially, on the timer value, wherein the validity timer is started at a time determined based, at least partially, on receiving the random access response;

in response to the indication to perform cell change to the target cell, determine whether the uplink grant is valid based, at least partially, on the validity timer;

stop the validity timer in response to:

the received indication to perform cell change to the target cell, and a determined change in a radio condition with respect to the target cell;

perform cell change to the target cell, wherein the determined change in the radio condition comprises a quality of a synchronization signal block associated with the target cell being below a threshold; and maintain the validity timer, maintain the uplink grant, and maintain a synchronization signal block associated with the uplink grant, after the cell change to the target cell, wherein the uplink grant is associated with a quasi co-location reference corresponding to a beam used for the random access channel signaling.

* * * * *